(12) United States Patent  (10) Patent No.: US 9,140,847 B2
Lin et al.                  (45) Date of Patent:    Sep. 22, 2015

(54) OPTICAL MODULE AND LAMP

(71) Applicant: Radiant Opto-Electronics Corporation, Kaohsiung (TW)

(72) Inventors: Wei-Chen Lin, Kaohsiung (TW); Shin-Hua Chu, Kaohsiung (TW); Shu-Hua Yeh, Kaohsiung (TW); Hui-Ching Hsueh, Kaohsiung (TW)

(73) Assignee: RADIANT OPTO-ELECTRONICS CORPORATION, Kaohsiung (TW)

( * ) Notice: Subject to any disclaimer, the term of this patent is extended or adjusted under 35 U.S.C. 154(b) by 101 days.

(21) Appl. No.: 14/133,672

(22) Filed: Dec. 19, 2013

(65) Prior Publication Data

US 2014/0369069 A1    Dec. 18, 2014

(30) Foreign Application Priority Data

Jun. 18, 2013  (TW) .............................. 102121562 A

(51) Int. Cl.
*F21V 7/04* (2006.01)
*F21V 8/00* (2006.01)

(52) U.S. Cl.
CPC .................................... G02B 6/0055 (2013.01)

(58) Field of Classification Search
CPC ............................ G02B 6/0055; G02B 6/0056
USPC ........................... 362/609, 19; 349/74, 61, 62
See application file for complete search history.

(56) References Cited

U.S. PATENT DOCUMENTS

| 6,847,427 B2* | 1/2005 | Yamauchi ..................... 349/113 |
| 2004/0100423 A1* | 5/2004 | Nagakubo et al. .............. 345/40 |
| 2012/0113054 A1* | 5/2012 | Hashimoto et al. ........... 345/174 |

FOREIGN PATENT DOCUMENTS

| CN | 1410810 A | 4/2003 |
| CN | 1499250 A | 5/2004 |
| CN | 101334135 A | 12/2008 |
| JP | 09-138406 A | 5/1997 |
| TW | 201248269 A | 12/2012 |

* cited by examiner

*Primary Examiner* — Ali Alavi
(74) *Attorney, Agent, or Firm* — CKC & Partners Co., Ltd.

(57) ABSTRACT

A lamp includes a frame, a light guide plate, a light source and a reflecting structure. The light guide plate is disposed on the frame and includes a light-incident surface, a first light-emitting surface and a second light-emitting surface. The second light-emitting surface is opposite to the first light-emitting surface, in which the light-incident surface connects the first light-emitting surface and the second light-emitting surface. The light source is adjacent to the light-incident surface and the light source is disposed in the frame. The reflecting structure is adjacent to the first light-emitting surface and includes at least two transparent sheets. The two transparent sheets are separated by an air gap, such that at least one light beam emitted from the first light-emitting surface is reflected back to the light guide plate and is emitted out from the second light-emitting surface.

17 Claims, 5 Drawing Sheets

OPTICAL MODULE AND LAMP

RELATED APPLICATIONS

This application claims priority to Taiwan Application Serial Number 102121562, filed Jun. 18, 2013, which is herein incorporated by reference.

BACKGROUND

1. Field of Invention

The present invention relates to an illuminating device. More particularly, the present invention relates to an optical module and a double-sided light-emitting lamp.

2. Description of Related Art

Lamps become more diversified to meet market requirements. One of conventional lamps is a hanging transparent lamp which can emit light beam toward the ceiling and the ground simultaneously, so as to achieve better appearance and illumination. In addition, to meet actual applications, the quantity of downward emitted light is generally greater than that of upward emitted light.

For adjusting a ratio between the quantity of downward emitted light and that of upward emitted light, a conventional method is to deposit a metal film on another transparent plate surface of a lamp by evaporation. However, when being applied on a transparent plate with a large area, such method causes manufacture cost to be increased, and thus is not cost-effective to manufactures. Furthermore, after the metal film is deposited on the transparent plate surface, at least 10% of the light flux is absorbed, thus resulting in optical loss.

Hence, there is need to provide a lamp which can adjust the light-emitting quantity and decrease optical loss to overcome the aforementioned problems.

SUMMARY

One aspect of the present invention is to provide an optical module and a lamp, in which a reflecting structure is disposed adjacent to one of two light-emitting surfaces of a light guide plate. Therefore, the light-emitting quantity from the reflecting structure can be adjusted by changing the number of air gaps of the reflecting structure. Meanwhile, a portion of the light beam entering the reflecting structure is reflected back to the light guide plate from one side of the light guide plate, and further is emitted from the other side of the light guide plate, so as to increase the light-emitting quantity of the light beam emitted from the other side of the light guide plate and achieve an object of adjusting the light-emitting quantity ratio between two light-emitting surfaces of a double-sided light emitting lamp.

Another aspect of the present invention is to provide an optical module and a lamp using the reflecting structure which advantageously has a simple structure and low manufacture cost without affecting the overall optical efficiency, thereby achieving an object of adjusting a light-emitting quantity ratio. Meanwhile, optical loss also can be reduced by using the reflecting structure.

According to the aforementioned objects, the present invention provides a lamp. The lamp includes a frame, a light guide plate, a light source and a reflecting structure. The light guide plate is disposed on the frame and includes a light-incident surface, a first light-emitting surface and a second light-emitting surface. The second light-emitting surface is opposite to the first light-emitting surface, in which the light-incident surface connects the first light-emitting surface and the second light-emitting surface. The light source is adjacent to the light-incident surface, and the light source is disposed in the frame. The reflecting structure is adjacent to the first light-emitting surface and includes at least two transparent sheets. The at least two transparent sheets are separated by at least one air gap, such that at least one light beam emitted from the first light-emitting surface is reflected back to the light guide plate and is emitted out from the second light-emitting surface.

According to an embodiment of the present invention, each of the at least two transparent sheets is a polycarbonate sheet or a glass sheet.

According to an embodiment of the present invention, the reflecting structure further includes a plurality of spacers disposed between every two adjacent ones of the at least two transparent sheets for separating the at least two transparent sheets.

According to an embodiment of the present invention, the spacers are mesh points printed on the surfaces of the at least two transparent sheets.

According to an embodiment of the present invention, each of the at least two transparent sheets is a polymethacrylate sheet.

According to an embodiment of the present invention, when the number of the at least one air gap is one, and the number of the at least two transparent sheets is two, a ratio of a light-emitting quantity of the at least one light beam passing through the reflecting structure after being emitted from the first light-emitting surface to a light-emitting quantity of the at least one light beam emitted from, the second light-emitting surface is 35:65.

According to an embodiment of the present invention, when the number of the at least one air gap is two, and the number of the at least two transparent sheets is three, a ratio of a light-emitting quantity of the at least one light beam passing through the reflecting structure after being emitted from the first light-emitting surface to a light-emitting quantity of the at least one light beam emitted from the second light-emitting surface is 30:70.

According to an embodiment of the present invention, when the number of the at least one air gap is three, and the number of the at least two transparent sheets is four, a ratio of a light-emitting quantity of the at least one light beam passing through the reflecting structure after being emitted from the first light-emitting surface to a light-emitting quantity of the at least one light beam emitted from the second light-emitting surface is 27:73.

According to an embodiment of the present invention, when the number of the at least one air gap is four, and the number of the at least two transparent sheets is five, a ratio of a light-emitting quantity of the at least one light beam passing through the reflecting structure after being emitted from the first light-emitting surface to a light-emitting quantity of the at least one light beam emitted from the second light-emitting surface is 25:75.

According to an embodiment of the present invention, when the number of the at least one air gap is five, and the number of the at least two transparent sheets is six, a ratio of a light-emitting quantity of the at least one light beam passing through the reflecting structure after being emitted from the first light-emitting surface to a light-emitting quantity of the at least one light beam emitted from the second light-emitting surface is 23:77.

According to an embodiment of the present invention, in which a ratio of a light-emitting quantity of the at least one light beam passing through the reflecting structure after being emitted from the first light-emitting surface to a light-emitting quantity of the at least one light beam emitted from the second light-emitting surface is decreased while both of the number of the at least one air gap and the number of the at least two transparent sheets are added more.

According to the aforementioned aspects, the present invention provides an optical module for a lamp. The optical module includes a light guide plate and a reflecting structure. The light guide plate includes a first light-emitting surface and a second light-emitting surface opposite to the first light-emitting surface. The reflecting structure is adjacent to the first light-emitting surface and includes at least two transparent sheets. The at least two transparent sheets are separated by at least one air gap, such that at least one light beam emitted from the first light-emitting surface is reflected back to the light guide plate and is emitted out from the second light-emitting surface.

According to an embodiment of the present invention, each of the at least two transparent sheets is a polycarbonate sheet or a class sheet.

According to an embodiment of the present invention, the reflecting structure further includes a plurality of spacers disposed between every two adjacent ones of the at least two transparent sheets for separating the at least two transparent sheets.

According to an embodiment of the present invention, the spacers are mesh points printed on the surfaces of the at least two transparent sheets.

According to an embodiment of the present invention, each of the at least two transparent sheets is a polymethacrylate sheet.

According to an embodiment of the present invention, in which a ratio of a light-emitting quantity of the at least one light beam passing through the reflecting structure after being emitted from the first light-emitting surface to a light-emitting quantity of the at least one light beam emitted from the second light-emitting surface is decreased while both of the number of the at least one air gap and the number of the at least two transparent sheets are added more.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
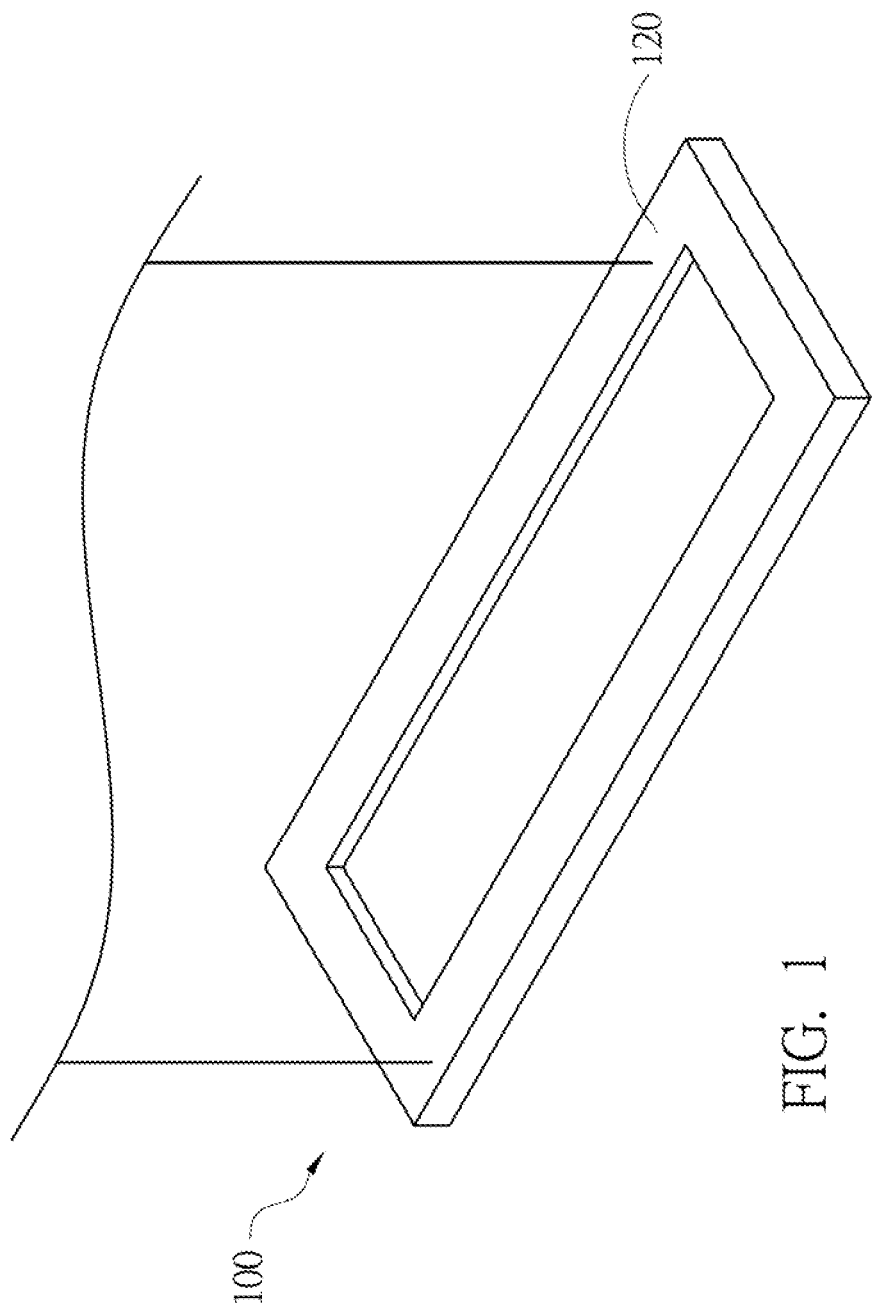
FIG. 1 is a schematic 3-D diagram of a lamp in accordance with an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
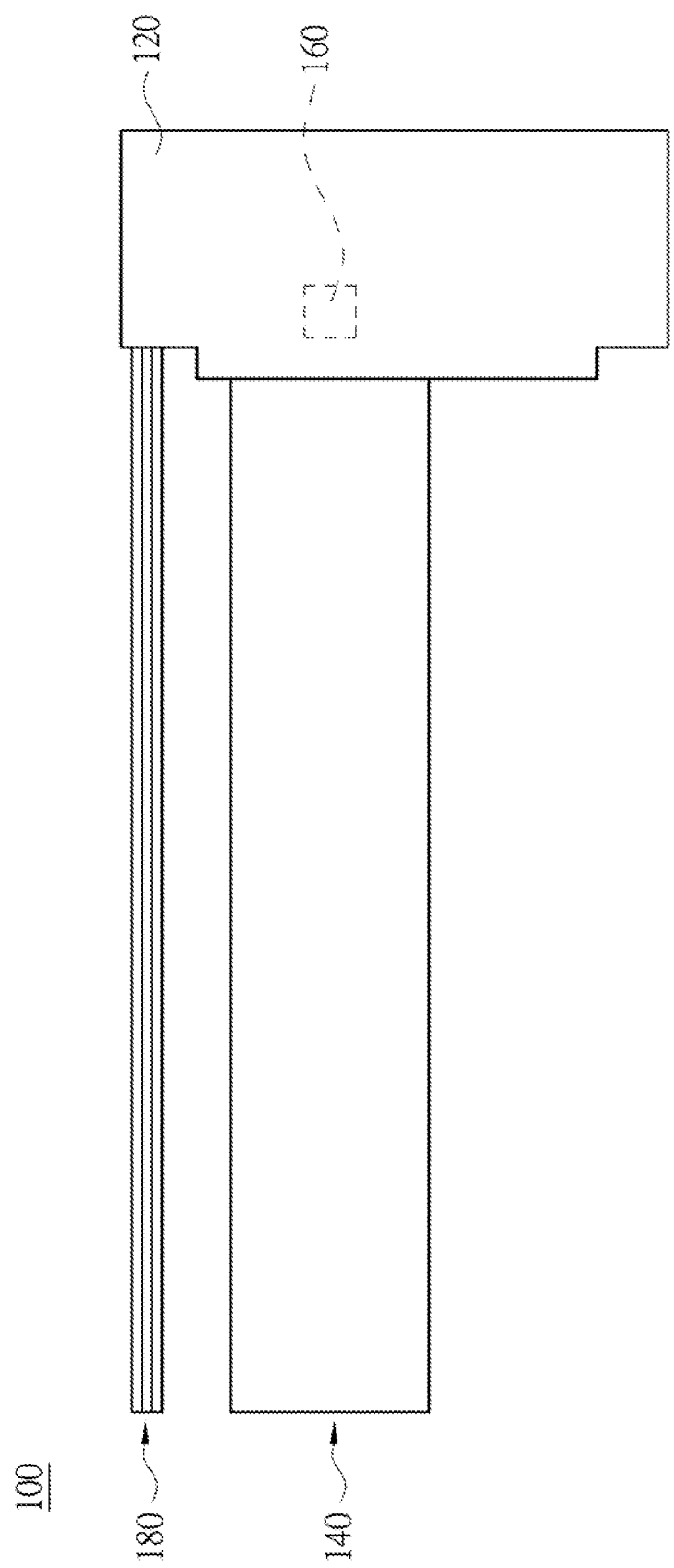
FIG. 2 is a schematic partial structural diagram of a lamp in accordance with an embodiment of the present invention.

Referring to FIG. 1 and FIG. 2, FIG. 1 is a schematic 3-D diagram of a lamp 100 in accordance with an embodiment of the present invention, and FIG. 2 is a schematic partial structural diagram of the lamp 100 in accordance with the embodiment of the present invention. In the present embodiment, the lamp 100 mainly includes a frame 120, a light guide plate 140, a light source 160 and a reflecting structure 180. The light guide plate 140 and the reflecting structure 180 are parallelly disposed in the frame 120. The light guide plate 140 has two light-emitting surfaces, and the reflecting structure 180 is disposed adjacent to one of the light-emitting surfaces. The reflecting structure 180 is used to adjust the ratio of the light-emitting quantities of the two light-emitting surfaces.

Figure 3:
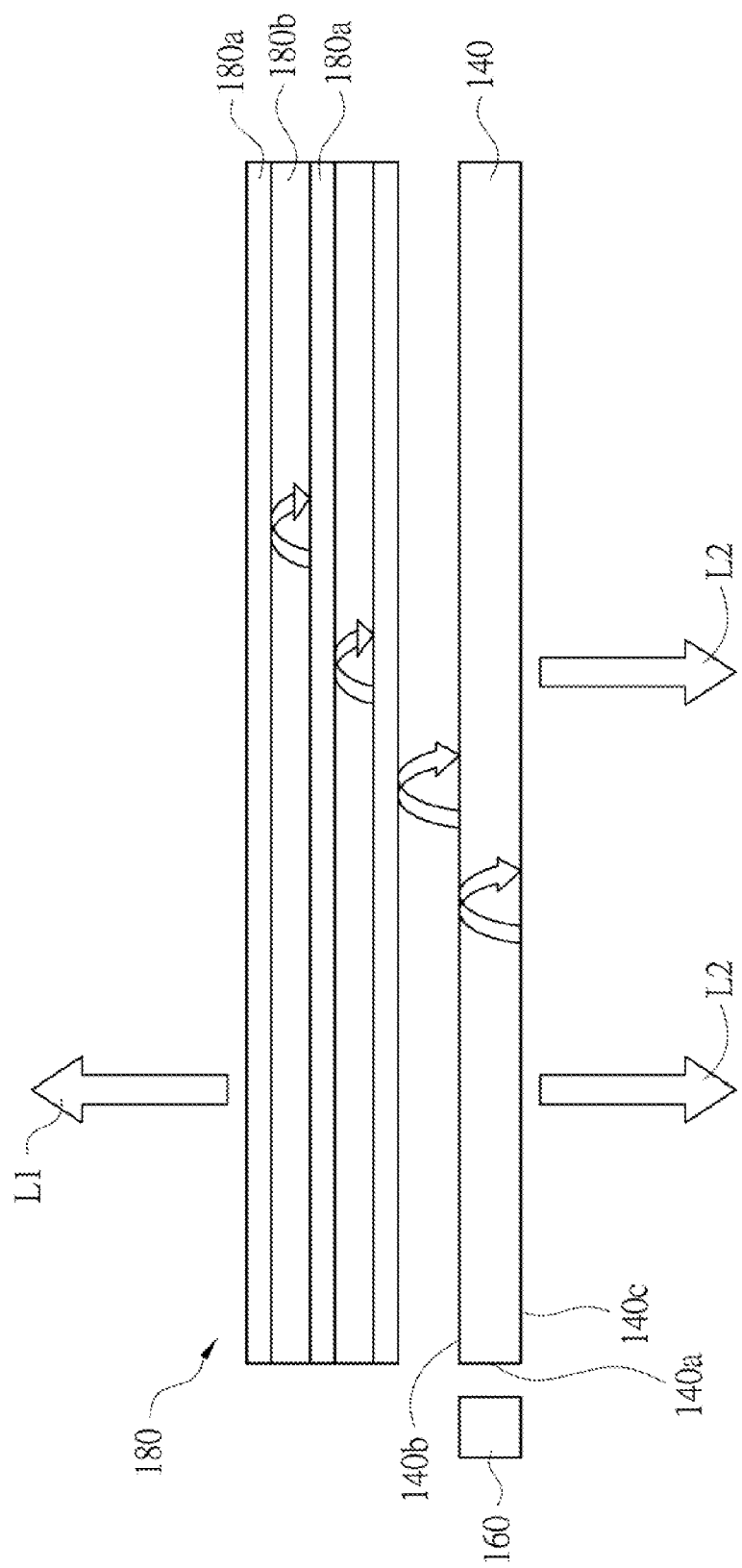
FIG. 3 is a schematic internal structural diagram of a lamp in accordance with an embodiment of the present invention.

Referring to FIG. 2 and FIG. 3 simultaneously, FIG. 3 is a schematic internal structural diagram of the lamp 100 in accordance with an embodiment of the present invention. The light guide plate 140 is disposed in the frame 120. The light guide plate 140 includes a light-incident surface 140a, a first light-emitting surface 140b and a second light-emitting surface 140c. The first light-emitting surface 140b and the second light-emitting surface 140c are respectively located on the two opposite sides of the light guide plate 140, and the light-incident surface 140a connects the first light-emitting surface 140b and the second light-emitting surface 140c. The light source 160 is disposed in the frame 120 and is adjacent to the light-incident surface 140a. The light source 160 is mainly used to emit at least one light beam, such that the light beam is emitted from the first light-emitting surface 140b and the second light-emitting surface 140c after entering the light guide plate 140 from the light-incident surface 140a.

In the present embodiment, the reflecting structure 180 is disposed in the frame 120 and is adjacent to the first light-emitting surface 140b. The reflecting structure 180 is mainly used to adjust the ratio of the light-emitting quantities of the light beams respectively emitted from the first light-emitting surface 140b and the second light-emitting surface 140c. The reflecting structure 180 includes at least two transparent sheets 180a. Every two adjacent ones of the at least two transparent sheets 180a are separated by an air gap 180b. In one embodiment, each of the transparent sheets 180a may be a polycarbonate sheet, a polymethacrylate sheet or a glass sheet.

The function of the air gap 180b is to reflect the light beam emitted from the first light-emitting surface 140b back to the light guide plate 140 and enable the light beam to be emitted from the second light-emitting surface 140c. The present embodiment uses the feature of "Fresnel loss" to reflect the light beam. "Fresnel loss" means that, when light beam passing through two media with different refractive indices, the light beam is reflected at a border between them. Therefore, the present embodiment uses such principle to make the reflecting structure 180 with at least one air gap 180b, such that one portion of the light beam passes through the reflecting structure 180, and the other portion of the light beam is reflected by the air gap 180b between the transparent sheets 180a.

Therefore, as shown in FIG. 3, after entering the light guide plate 140 from the light-incident surface 140a, the light beam emitted by the light source 160 is firstly emitted from the first light-emitting surface 140b and the second light-emitting surface 140c. One portion of the light beam emitted from the first light-emitting surface 140b passes through the reflecting structure 180 and is emitted from the reflecting structure 180 (such as a light beam L1 as shown in FIG. 3) Meanwhile, the other portion of the light beam emitted from the first light-emitting surface 140b is reflected by the reflecting structure 180 and re-enters the light guide plate 140, and then is emitted from the second light-emitting surface 140c. Therefore, a light beam L2 includes the light beam directly emitted from the second light-emitting surface 140c after being emitted from the light source 160 and the light beam reflected by the reflecting structure 180 after being emitted from the first light-emitting surface 140b. It can be known that the number of the air gap 180b can be added to increase the reflected times of the light beam in the reflecting structure 180, such that the light-emitting quantity of the light beam L1 passing through the reflecting structure 180 is reduced.

Referring to Table 1, Table 1 shows optical simulation results in accordance with different numbers of the air gaps 180b. A polymethacrylate transparent sheet is used as a tested object in Table 1. A light-emitting quantity of the light beam L1 represents the light-emitting quantity of the light beam passing through the reflecting structure 180. A light-emitting quantity of the light guide beam L2 represents the total light-emitting quantity of the light beam emitted from the second light-emitting surface 140c. Without disposing any transparent sheets 180a and the air gap 180b, a ratio of a light-emitting quantity of the light beam directly emitted from the first light-emitting surface to that of the light beam directly emitted from the second light-emitting surface is 44:56 and an equivalent transmission rate is 100%.

TABLE 1

Optical simulation results in accordance with different numbers of the air gaps

| the number of air gaps | 0 | 1 | 2 | 3 | 4 | 5 |
|---|---|---|---|---|---|---|
| L1/L1 + L2 | 44% | 35% | 30% | 27% | 25% | 23% |
| L2/L1 + L2 | 56% | 65% | 70% | 73% | 75% | 77% |
| overall optical efficiency | 75% | 74.2% | 74.1% | 73.9% | 73.8% | 74% |
| equivalent transmission rate of the light beam passing through the reflecting structure | 100% | 79.06% | 68.12% | 60.74% | 55.49% | 51.60% |

As shown in Table 1, when the number of the air gap 180b is one, and the number of the transparent sheets is two, a ratio of a light-emitting quantity of the light beam L1 to a light-emitting quantity of the light beam L2 is 35:65. When the number of the air gap 180b is two, and the number of the transparent sheets is three, a ratio of a light-emitting quantity of the light beam L1 to a light-emitting quantity of the light beam L2 is 30:70. When the number of the air gap 180b is three, and the number of the transparent sheets is four, a ratio of a light-emitting quantity of the light beam L1 to a light-emitting quantity of the light beam L2 is 27:73. When the number of the air gap 180b is four, and the number of the transparent sheets is five, a ratio of a light-emitting quantity of the light beam L1 to a light-emitting quantity of the light beam L2 is 25:75. When the number of the air gap 180b is five, and the number of the transparent sheets is six, a ratio of a light-emitting quantity of the light beam L1 to a light-emitting quantity of the light beam L2 is 23:77. Meanwhile, when the number of the air gaps 180b is added, the equivalent transmission rate of the light beam passing through the reflecting structure 180 is decreased, meaning that the light-emitting quantity can be adjusted by changing the number of the air gaps 180b. In addition, as shown in Table 1, the overall optical efficiency presents a ratio of the amount of light from both of the first light-emitting surface 140b and the second light-emitting surface 140c to the light source 160. The overall optical efficiency is seldom affected by the number of the transparent sheets 180a and the number of the air gaps 180b.

Figure 4:
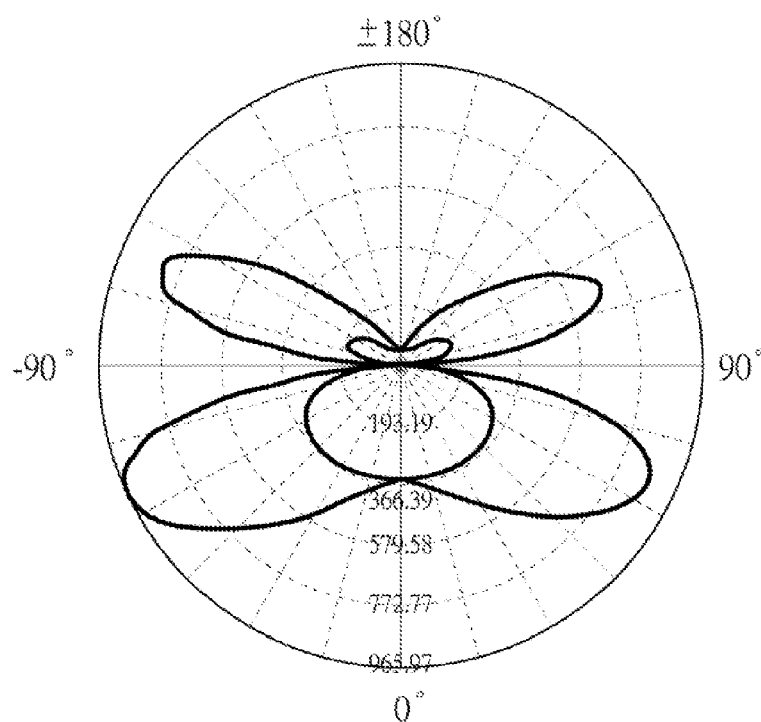
FIG. 4 is a candlepower distribution curve generated from a lamp which has one air gap in accordance with an embodiment of the present invention.
Figure 5:
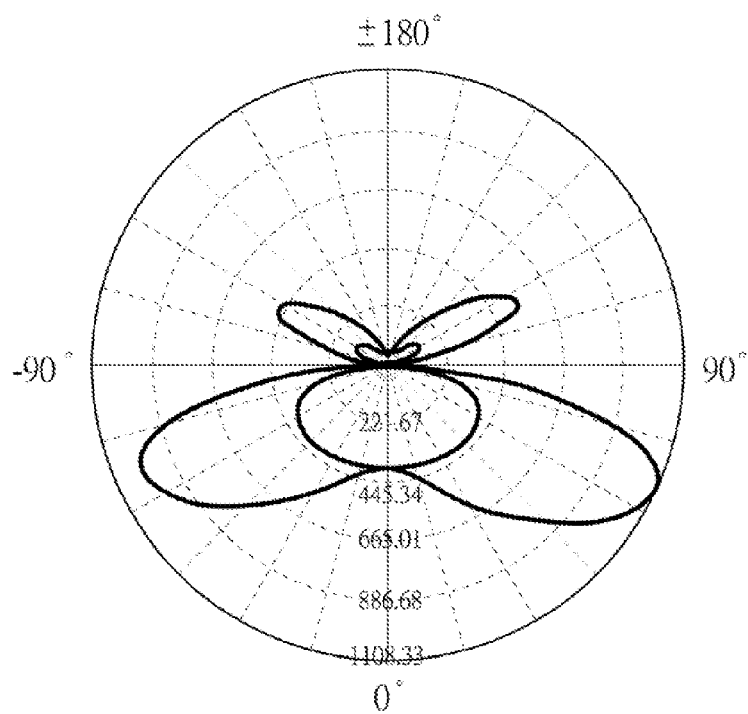
FIG. 5 is a candlepower distribution curve generated from a lamp which has five air gaps in accordance with an embodiment of the present invention.

Referring to FIG. 4 and FIG. 5, FIG. 4 is a candlepower distribution curve generated from a lamp which has one air gap in accordance with an embodiment of the present invention, and FIG. 5 is a candlepower distribution curve generated from a lamp which has five air gaps in accordance with an embodiment of the present invention. Experimental results in FIG. 4 and FIG. 5 are consistent with the aforementioned simulation results. When the number of the air gap 180b is one, the luminous flux is 4133.84 lumen. When the number of the air gaps 180b is five, the luminous flux is 3978.73 lumen and the luminous flux loss is 3.8%.

Figure 6:
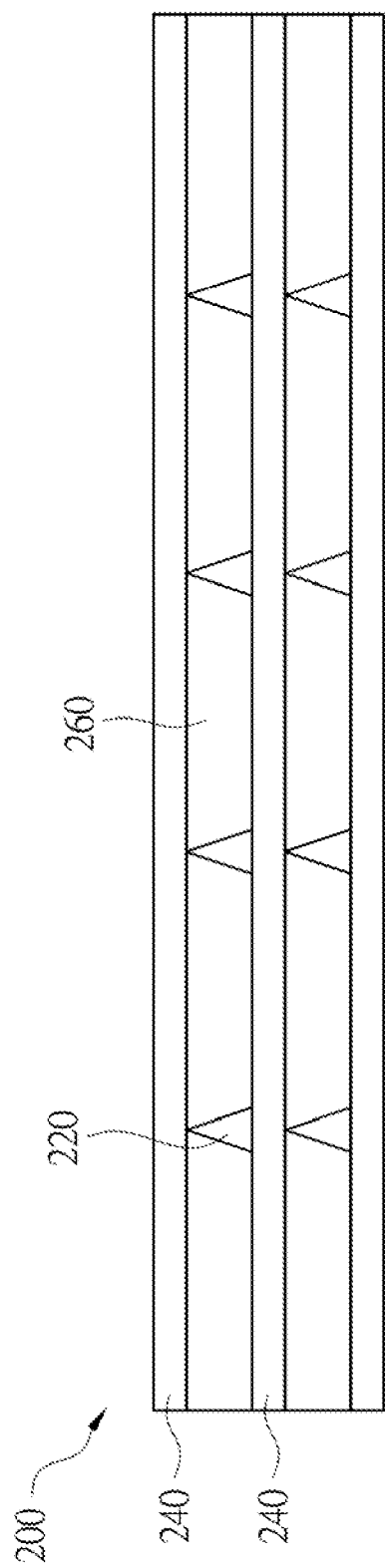
FIG. 6 is a schematic structural diagram of a reflecting structure in accordance with an embodiment of the present invention.

Referring to FIG. 6, FIG. 6 is a schematic structural diagram of a reflecting structure 200 in accordance with an embodiment of the present invention. The reflecting structure 200 includes a plurality of spacers 220. Each of the spacers 220 is disposed between every two adjacent ones of the transparent sheets 240 for separating the two adjacent transparent sheets 240, thereby forming an air gap 260 therebetween. In one embodiment, the spacers 220 are mesh points printed on the surfaces of the transparent sheets 240. In one embodiment, the distribution and the number of the spacers 220 are designed corresponding to the material strength of the transparent sheets 240 or the stress analysis resulted from the transparent sheets 240. Therefore, if the transparent sheets 240 with stronger material strength are used, the number of the spacers 220 can be reduced or the distance between every two adjacent ones of spacers 220 can be changed.

According to the aforementioned embodiments of the present invention, the reflecting structure is disposed adjacent to one of two light-emitting surfaces of a light guide plate. Therefore, the light-emitting quantity from the reflecting structure can be adjusted by changing the number of the air gaps of the reflecting structure. Meanwhile, a portion of the light beam entering the reflecting structure is reflected back to the light guide plate from one side of the light guide plate, and is further emitted from the other side of the light guide plate, so as to increase the light-emitting quantity of the light beam emitted from the other side of the light guide plate and achieve an object of adjusting the light-emitting quantity ratio between two light-emitting surfaces of a double-sided light emitting lamp.

According to the aforementioned embodiments of the present invention, the present invention uses the reflecting structure which advantageously has a simple structure and low manufacture cost to achieve an object of adjusting a light-emitting quantity ratio. Meanwhile, optical loss can also be reduced by using the reflecting structure.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A lamp, comprising:
   a frame;
   a light guide plate which is disposed on the frame and comprises:
      a light-incident surface;
      a first light-emitting surface; and
      a second light-emitting surface opposite to the first light-emitting surface, wherein the light-incident surface connects the first light-emitting surface and the second light-emitting surface;
   a light source which is adjacent to the light-incident surface and is disposed in the frame;
   a reflecting structure which is adjacent to the first light-emitting surface and comprises:
      at least two transparent sheets which are separated by at least one air gap, such that at least one light beam emitted from the first light-emitting surface is reflected back to the light guide plate and is emitted out from the second light-emitting surface.

2. The lamp of claim 1, wherein each of the at least two transparent sheet a polycarbonate sheet or a glass sheet.

3. The lamp of claim 1, wherein the reflecting structure further comprises a plurality of spacers disposed between every two adjacent ones of the at least two transparent sheets for separating the at least two transparent sheets.

4. The lamp of claim 3, wherein the spacers are mesh points printed on the surfaces of the at least two transparent sheets.

5. The lamp of claim 1, wherein each of the at least two transparent sheets is a polymethacrylate sheet.

6. The lamp of claim 5, wherein when the number of the at least one air gap is one, and the number of the at least two transparent sheets is two, a ratio of a light-emitting quantity of the at least one light beam passing through the reflecting structure after being emitted from the first light-emitting surface to a light-emitting quantity of the at least one light beam emitted from the second light-emitting surface is 35:65.

7. The lamp of claim 5, wherein when the number of the at least one air gap is two, and the number of the at least two transparent sheets is three, a ratio of a light-emitting quantity of the at least one light beam passing through the reflecting structure after being emitted from the first light-emitting surface to a light-emitting quantity of the at least one light beam emitted from the second light-emitting surface is 30:70.

8. The lamp of claim 5, wherein when the number of the at least one air gap is three, and the number of the at least two transparent sheets is four, a ratio of a light-emitting quantity of the at least one light beam passing through the reflecting structure after being emitted from the first light-emitting surface to a light-emitting quantity of the at least one light beam emitted from the second light-emitting surface is 27:73.

9. The lamp of claim 5, wherein when the number of the at least one air gap is four, and the number of the at least two transparent sheets is five, a ratio of a light-emitting quantity of the at least one light beam passing through the reflecting structure after being emitted from the first light-emitting surface to a light-emitting quantity of the at least one light beam emitted from the second light-emitting surface is 25:75.

10. The lamp of claim 5, wherein when the number of the at least one air gap is five, and the number of the at least two transparent sheets is six, a ratio of a light-emitting quantity of the at least one light beam passing through the reflecting structure after being emitted from the first light-emitting surface to a light-emitting quantity of the at least one light beam emitted from the second light-emitting surface is 23:77.

11. The lamp of claim 1, wherein a ratio of a light-emitting quantity of the at least one light beam passing through the reflecting structure after being emitted from the first light-emitting surface to a light-emitting quantity of the at least one light beam emitted from the second light-emitting surface is decreased while both of the number of the at least one air gap and the number of the at least two transparent sheets are added more.

12. An optical module for lamp, comprising:
   a light guide plate comprising:
      a first light-emitting surface; and
      a second light-emitting surface opposite to the first light-emitting surface; and
   a reflecting structure which is adjacent to the first light-emitting surface and comprises:
      at least two transparent sheets which are separated by at least one air gap, such that at least one light beam emitted from the first light-emitting surface is reflected back to the light guide plate and is emitted out from the second light-emitting surface.

13. The optical module for lamp of claim 12, wherein each of the at least two transparent sheets is a polycarbonate sheet or a glass sheet.

14. The optical module for lamp of claim 12, wherein the reflecting structure further comprises a plurality of spacers disposed between every two adjacent ones of the at least two transparent sheets for separating the at least two transparent sheets.

15. The optical module for lamp of claim 14, wherein the spacers are mesh points printed on the surfaces of the at least two transparent sheets.

16. The optical module for lamp of claim 12, wherein each of the at least two transparent sheets is a polymethacrylate sheet.

17. The optical module for lamp of claim 12, wherein a ratio of a light-emitting quantity of the at least one light beam passing through the reflecting structure after being emitted from the first light-emitting surface to a light-emitting quantity of the at least one light beam emitted from the second light-emitting surface is decreased while both of the number of the at least one air gap and the number of the at least two transparent sheets are added more.

* * * * *